(12) United States Patent
Graves et al.

(10) Patent No.: US 6,452,145 B1
(45) Date of Patent: Sep. 17, 2002

(54) METHOD AND APPARATUS FOR WAVEFRONT SENSING

(75) Inventors: J. Elon Graves; Malcolm J. Northcott, both of Honolulu, HI (US)

(73) Assignee: AOptix Technologies, Inc., Campbell, CA (US)

( * ) Notice: Subject to any disclaimer, the term of this patent is extended or adjusted under 35 U.S.C. 154(b) by 0 days.

(21) Appl. No.: 09/579,786

(22) Filed: May 26, 2000

Related U.S. Application Data

(60) Provisional application No. 60/178,416, filed on Jan. 27, 2000.

(51) Int. Cl.[7] .................................................. G01J 1/20
(52) U.S. Cl. ..................................... 250/201.9; 356/121
(58) Field of Search ............................ 250/201.9, 201.1; 356/121, 124, 124.5, 125

(56) References Cited

U.S. PATENT DOCUMENTS

| | | | | |
|---|---|---|---|---|
| 5,233,174 A | * | 8/1993 | Zmek | 250/201.9 |
| 5,329,322 A | | 7/1994 | Yancey | 351/211 |
| 5,576,780 A | | 11/1996 | Yancey | 351/211 |
| 5,777,719 A | | 7/1998 | Williams et al. | 351/212 |
| 5,949,521 A | | 9/1999 | Williams et al. | 351/246 |
| 6,023,057 A | | 2/2000 | Gaffard et al. | 250/201.9 |

OTHER PUBLICATIONS

Laser Guide Star Adaptive Optics Workshop: Proceedings—vol. 1 (Mar. 10–12, 1992).

Publication entitled "A Simple Low–Order Adaptive Optics System For Near–Infrared Applications"; Publications of the Astronomical Society of the Pacific; vol. 103, Jan. 1991, No. 659 by Roddier et al.

Proceedings of SPIE 3353, Mar. 1998 entitled First Light For Hokupa'a; Author Graves et al.

Publication entitled "Objective Measurement of Wave Aberrations of the Human Eye with the Use of a Hartmann––Shack Wave–Front Sensor", J. Opt. Soc. Am. A., vol. 11, No. 7, pp. 1–9, Jul. 1994; Authors Liang et al.

Publication entitled "Scanning Laser Tomography of the Living Human Eye" in the Noninvasive Diagnostic Techniques in Ophthalomogy. Masters BR (ed.), Springer–Verlag, pp. 528–547 (1990); Authors Bille et al.

Publication entitled "Measurement of the Wage Aberration of the Human Eye"; Biophysics 1961; 6: 776–94; by Smirnov MS.

Publication entitled "Subjective Measurement of High–Order Aberrations of the Eye", Science, 1976; 193: 580–2 by Howland B. et al.

Publication entitled "A Subjective Method for the Measurement of Monochromatic Aberrations of the Eye", J. Opt Soc. Am 1977; 67(11): 1508–1518 by Howland HC et al.

(List continued on next page.)

Primary Examiner—Kevin Pyo
(74) Attorney, Agent, or Firm—Lyon & Lyon LLP

(57) ABSTRACT

A wavefront sensor for detecting the wavefront produced by light waves from a light source comprises optically refractory or reflective means for receiving the light waves from the light source and producing two defocused pupil images at two different locations along an optical axis. A detector is positioned at a location spaced from the two locations of the two focused pupil images for the detector means to receive and detect two equally and oppositely defocused pupil images. A computer with appropriate software processes the characteristics of the two defocused pupil images from the detector to determine the curvature of the wavefront based on the light intensities with Dirichlet's boundary conditions for the light waves received by the wavefront sensor.

104 Claims, 4 Drawing Sheets

OTHER PUBLICATIONS

Publication entitled "Objective Technique for the Determination of Monochromatic Aberrations of the Human Eye", J. opt. Soc. Am. A., vol. 1, No. 9, pp. 987–992 (1984) by Walsh et al.

Publication entitled "Measurement of the Axial Wavefront Aberration of the Human Eye". Opthal Physiol Opt. 1985; 5: 23–31 by Walsh, G. et al.

Publication entitled "Wavefront Abberation of the Eye: A Review"; Optometry and Vision Science 1991; 68(3): 574–583 by Charman WN.

Publication entitled "Measurement of Monochromatic Ocular Aberrations of human Eyes as a Function of Accomodation by the Howland Aberroscope Technique"; Vision Res. 1995: 35(3): 313–23 by Atchinson DA et al.

Publication entitled "Reliability and Validity Studies of a New Computer–Assisted Crossed–Cylinder Aberroscope"; Optom Vis. Sci. 1997; 74(7): 570–80 by Cox MJ et al.

Publication entitled "Retrieval of Wave Aberration of Human Eyes from Actual Point–Spread Function Data"; J. Opt Soc. Am 1988; 5(8): 1201–6 by Artal P. et al.

Publication entitled "Wavefront Determination Resulting From Foucault Tests Applied to the Human Eye and Visual Instruments"; In Optical instruments and Techniques, Dickson JH (ed.), London, Oriel, 1969, 375–85.

Publication entitled "Computing High order Wave Aberration Coefficients from Small Variations of Best Focus for Small Artificial Pupils"; Vision Res. 1989; 29(8); 979–83 by Howland HC et al.

Publication entitled "Active Optical Depth Resolution Improvement of the Laser Tomographic Scanner"; Applied Optics, vol. 28, No. 4, pp. 804–808, (1989) by Dreher et al.

Publication entitled "Curvature Sensing and Compensation: A New concept in Adaptive Optics"; applied Optics, vol. 27, pp. 1223–5, 1988 by Roddier F.

Publication entitled "Wavefront Sensing and the Irradiance Transport Equation"; Applied Optics, vol. 29 (10), pp. 1402–3, 1990 by Roddier F.

Publication entitled "New Optical Testing methods Developed at the University of Hawaii; Results of Ground–Based Telescopes and Hubble Space Telescope"; SPIE, vol. 1531. Pp. 37–43, 1991 by Roddier C. et al.

* cited by examiner

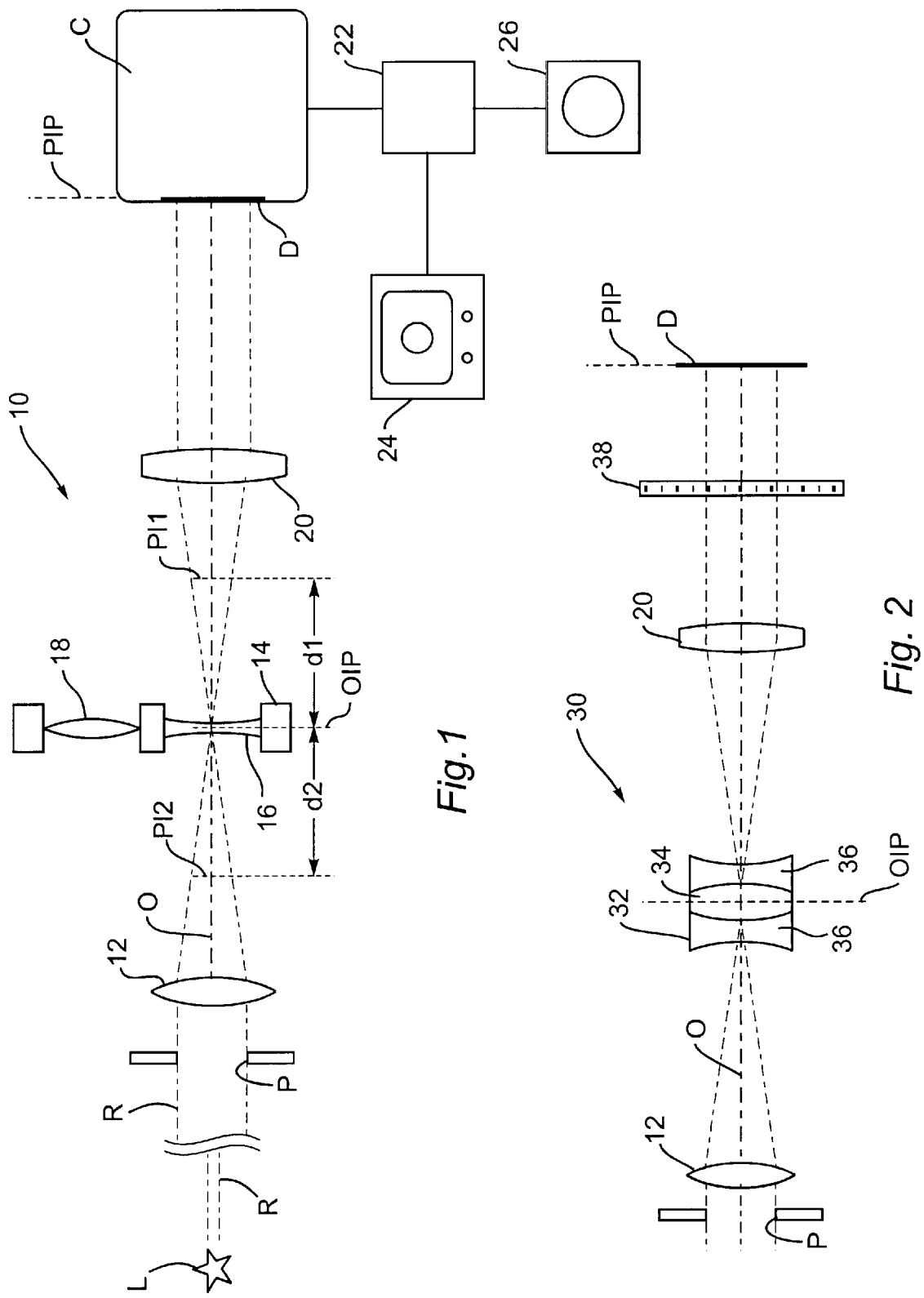

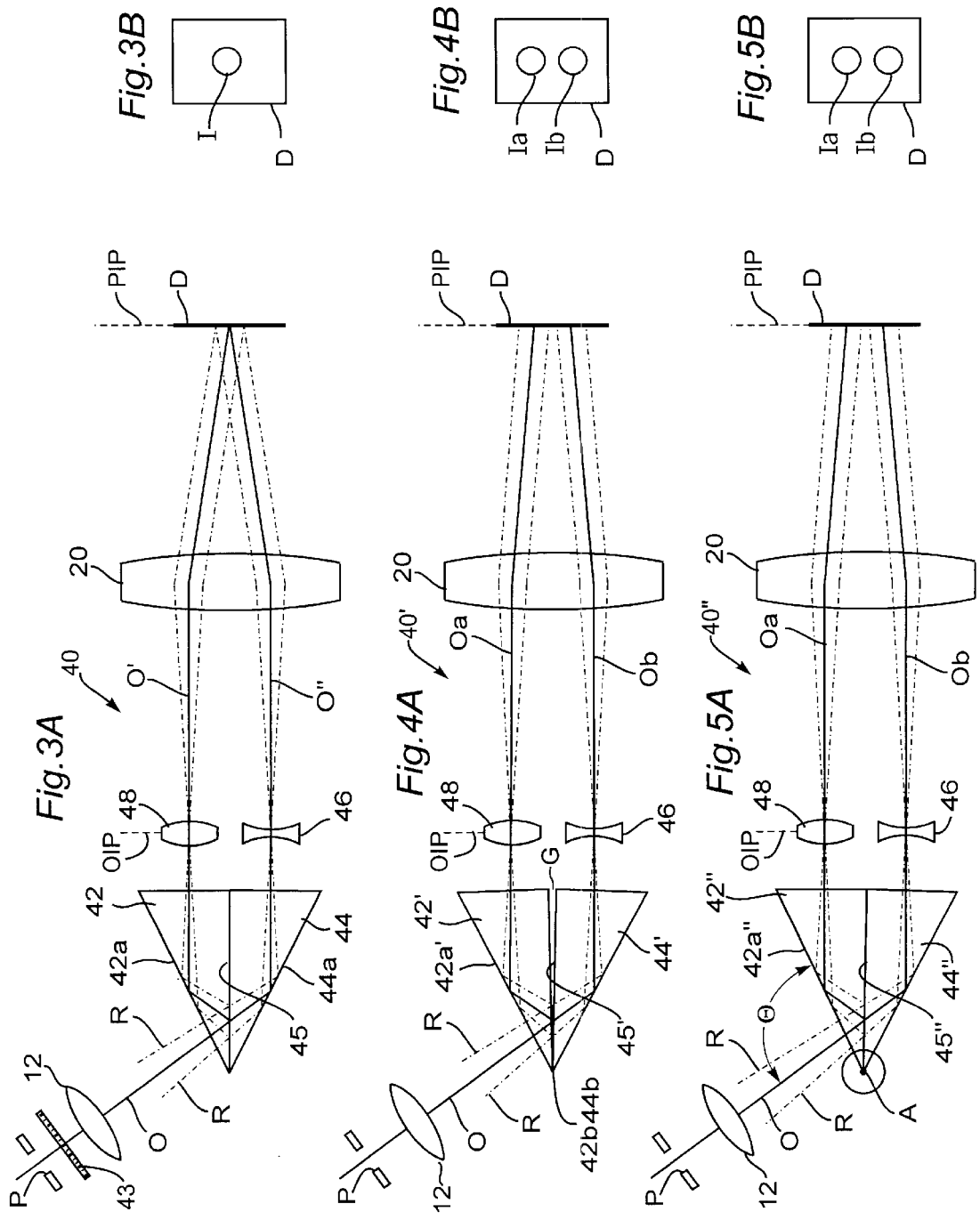

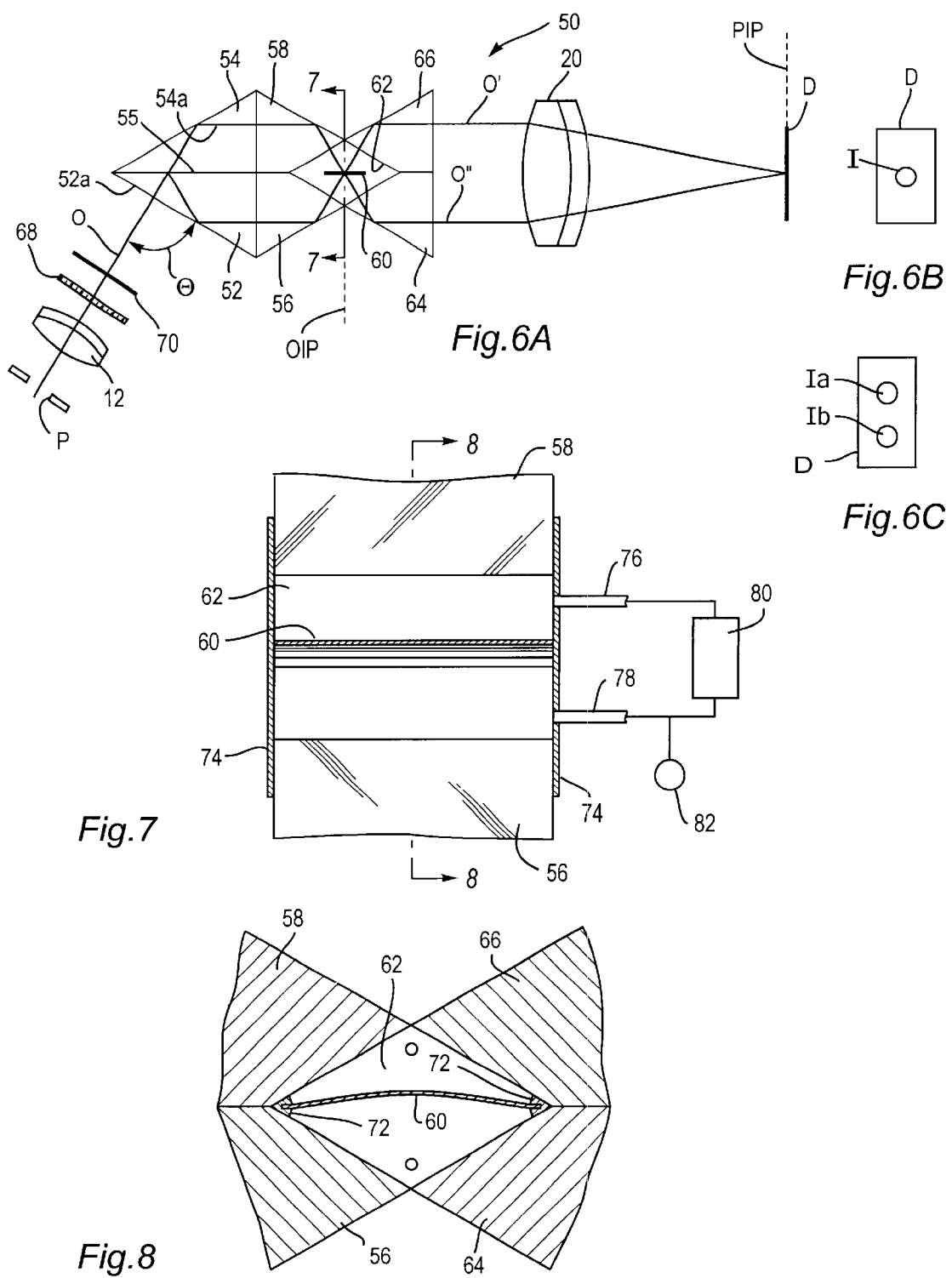

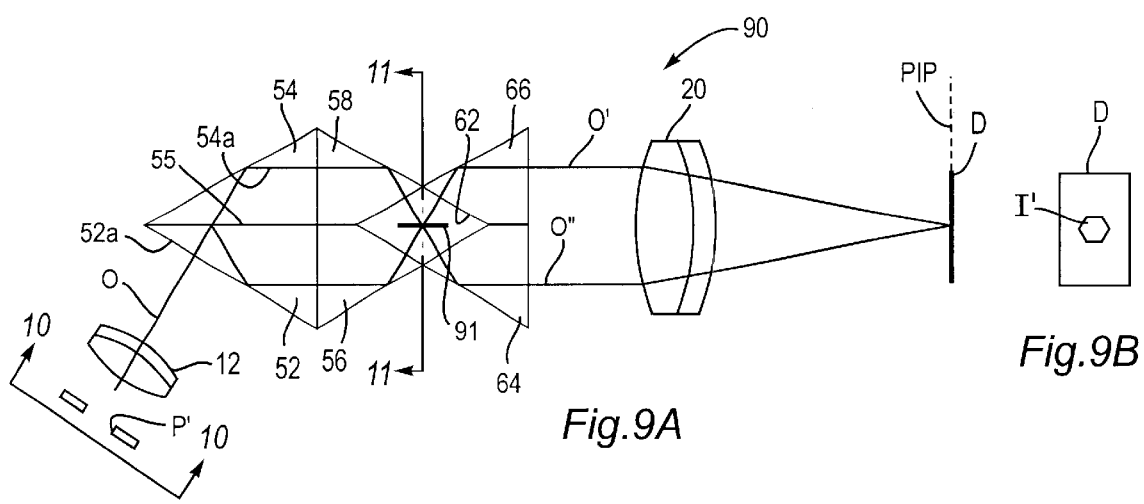
Fig.9A
Fig.9B
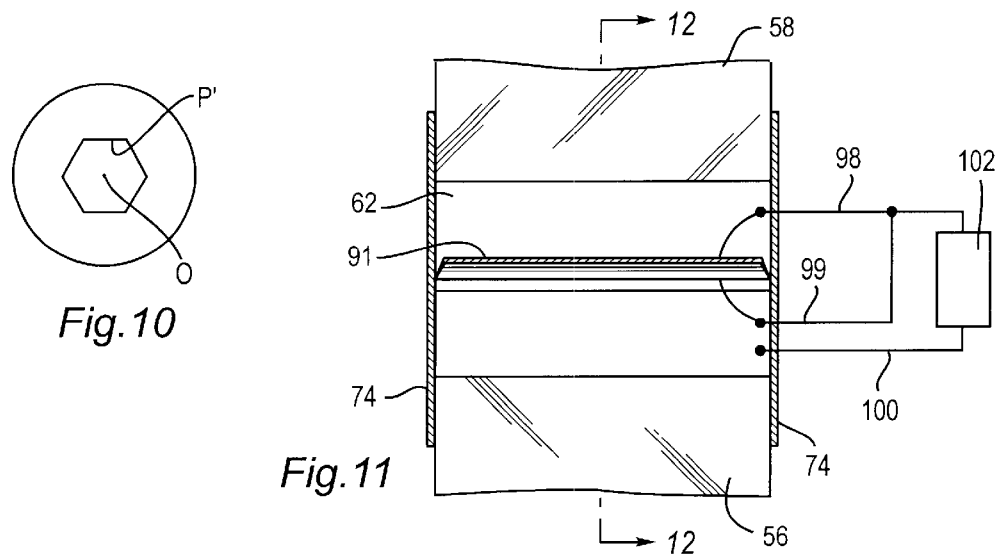
Fig.10
Fig.11
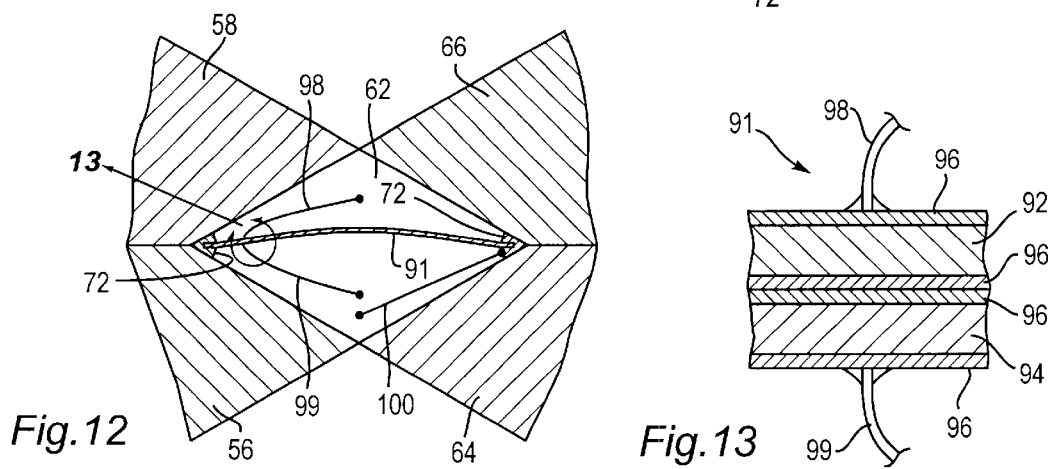
Fig.12
Fig.13

METHOD AND APPARATUS FOR WAVEFRONT SENSING

This application bases priority on Provisional Patent Application Serial No. 60/178,416, filed Jan. 27, 2000.

The present invention relates to sensing the shape of the wavefront of visible and invisible light rays and, in particular, for directly sensing the curvature of the wavefront for use in various applications.

There are various methods and devices for sensing the wavefront of light waves for then measuring and/or correcting aberrations in the wavefront that are sensed by the device. The existing methods and devices of sensing and measurement include several interferometric techniques, the Shack-Hartmann wavefront sensing techniques and various other systems involving the projection of patterns of light through an optical system. Such prior techniques and systems are typically complex and expensive, as well as having various inherent deficiencies. For example, many such systems and techniques require access to the focal plane of the optical system being tested for sensing the wavefront which is not possible in many applications, such as for measuring the optical aberrations of the lens system of the human eye because the focal plane is inside the eyeball. While the Shack-Hartmann wavefront sensor does not require access to the focal plane, whereby it may be used for measuring the optical aberrations of the human eye for example, such sensor has numerous other deficiencies. The Shack-Hartmann wavefront sensor measures the gradient of the wavefront rather than directly measuring the curvature of the wavefront, which is not completely accurate for some applications and impairs the speed of any corrective adaptive optics procedures that may be taken in applications requiring high speed corrections. Also, the Shack-Hartmann system uses an array of light detectors that senses the position of a single image whereby any gain or bias in individual detectors produce a false result. The Shack-Hartmann device requires periodic calibration. Further, the Shack-Hartmann system doesn't respond correctly to extend objects, such as plural point sources of light, for the most common implementations. Some other wavefront sensing techniques and devices are not directly applicable to adaptive optics techniques for correcting the wavefront to thereby correct the image, such as used in celestial telescopes for correcting aberrations caused by continual changes in the atmosphere that adversely affect the seeing of the telescope.

It is an object of the present invention to provide a novel wavefront sensing device and method that uses defocused pupil images for sensing the curvature of the wavefront of light waves for any desired application of the wavefront data and/or pupil images. A further object of this invention is to provide such a wavefront sensor that employs optical means for producing at least one defocused pupil image on a detector and means for processing that defocused pupil image to determine the curvature of the wavefront of the light waves received by the optical means. A still further object of this invention is to provide such a wavefront sensor wherein the optical means produces two defocused pupil images on a detector means wherein the two defocused pupil images thereof are located at equal distances in front of and behind the object image plane for the processing means to compare equally defocused pupil images in determining the curvature of the wavefront.

Other and more detailed objects and advantages of the present invention will appear to those skilled in the art from the detailed description of the preferred embodiments in conjunction with the drawings, wherein:

FIG. 1 is a diagrammatic illustration of a first embodiment of the wavefront sensor of the present invention;

FIG. 2 is a diagrammatic illustration of a second embodiment of the wavefront sensor of the present invention;

FIG. 3A is a diagrammatic illustration of a third embodiment of the present invention;

FIG. 3B is an illustration of the defocused pupil image produced on the detector in the wave sensor embodiment of FIG. 3A;

FIG. 4A is a diagrammatic illustration of a modified form of the wavefront sensor of FIG. 3A;

FIG. 4B is an illustration of the two separate defocused pupil images on the detector of the wavefront sensor of FIG. 4A;

FIG. 5A is a diagrammatic illustration of another modified form of the wavefront sensor of FIG. 3A;

FIG. 5B is an illustration of the two separate defocused pupil images on the detector of the wavefront sensor of FIG. 4A;

FIG. 6A is a diagrammatic illustration of a fourth embodiment of wavefront sensor of the present invention;

FIG. 6B is an illustration of the single defocused pupil image on the detector of the wavefront sensor of FIG. 6A;

FIG. 6C is an illustration of the two separate defocused pupil images on the detector of a modified form of the wavefront sensor of FIG. 6A;

FIG. 7 is a fragmentary sectional view taken on the line 7—7 in FIG. 6A;

FIG. 8 is a fragmentary sectional view taken on the line 8—8 in FIG. 7.

FIG. 9A is a diagrammatic illustration of a fifth embodiment of the wavefront sensor of the present invention;

FIG. 9B is an illustration of the single defocused pupil image on the detector of the wavefront sensor of FIG. 9A;

FIG. 10 is a view of the optical system pupil taken on the line 10—10 in FIG. 9A;

FIG. 11 is a fragmentary sectional view taken on the line 11—11 in FIG. 9A;

FIG. 12 is a fragmentary sectional view taken on the line 12—12 in FIG. 11; and

FIG. 13 is an enlarged portion of FIG. 12 at the circle 13.

Referring now to FIG. 1, a simplified form of the novel wavefront sensor 10 of the present invention is diagrammatically illustrated as it would be used for sensing a wavefront from any light source L, such as the illustrated star when the wavefront sensor 10 is used in conjunction with a celestial telescope (not shown) for sensing the light rays R emanating from the star. A star emanates a spherical wave of light, but at a great distance from the star the light wavefront is flat for all practical purposes. Thus, in FIG. 1 the light rays R reaching a telescope from a distant star (light source L) theoretically would be parallel and in perfect alignment to produce a flat wavefront. However, as is well known to astronomers, the earth's atmosphere creates aberrations in the light rays R before reaching the telescope, which aberrations vary with the atmospheric conditions and rapidly over any period of time, even when the telescope is located at high elevations. Therefore various wavefront sensors have been used to detect the variations in the wavefront caused by the aberrations and then compensate or correct for the aberrations in a technique known as "adaptive optics" to achieve a more accurate image of the star.

Similarly, the light rays R emanating from other light sources L are subject to aberrations that change the wavefront that can be sensed by the wavefront sensor 10, as well as the other embodiments of the present invention shown in the other Figures, such as light reflected from the retina of the human eye as the light source L where the aberrations are caused by the crystalline lens and cornea of the eye, or a light source L from an optical data transmission system directed through the atmosphere, such as from building to building, with aberrations created by the movement of air and variations in air density in the atmosphere. Thus, with this embodiment of FIG. 1, as well as the embodiments of the other Figures, the light source L may be of any type that produces light rays, visible or invisible that are subject to variations in the wavefront that require sensing for any purpose including, but not limited to, adaptive optics corrections. Elements of the various embodiments of the devices shown in the various Figures that are the same or substantial similar are identified by the same numerals in the following descriptions whereby such elements will not be described in detail for each embodiment.

The light rays R are received by a lens 12 and focused on the object image plane OIP where the image of the light source L (here a star) exists in focus. An analyzer lens group 14 which includes a negative analyzer lens 16 and a positive analyzer lens 18 are located on the object image plane OIP. Preferably, the analyzer lenses 16 and 18 are of equal but opposite power focal lengths for convenience in analyzing the images, as will be discussed below, but the pair of analyzer lenses 16 and 18 may be of any convenient focal length and either both positive or both negative, as long as their respective images are focused at different locations along the optical axis with respect to the plane of an image detector D. Further, the pair of analyzer lenses 16 and 18 are mounted for alternately being positioned on the optical axis O in the object image plane OIP of the wavefront sensor 10 such as by reciprocating the lens group 14 or mounting the analyzer lenses 16 and 18 in a lens wheel for rotating the lenses in and out of the optical axis O. Such a lens wheel may be provided with additional pairs of analyzer lenses of different focal lengths for providing different sensitivities in the wavefront sensor 10. Further, a lens with an adjustable focal length, such as a zoom lens, may be substituted for or provided in addition to the analyzer lenses 16 and 18.

A collimating lens 20 is provided on the optical axis O between the analyzer lens group 14 and the plane of the image detector D, which location in this optical system is preferably at one focal length from both the analyzer lens group 14 and the detector D, although it could be at other locations, for directing the light rays to the detector D. With the analyzer lenses 16 and 18 positioned completely off the optical axis O, the entrance pupil P of the optical system is focused on the detector D at a pupil image plane PIP and it is essential that the pupil image is in sharp focus on the detector D. In some applications the detector D may be located at other than one focal length from the collimating lens 20 as long as it is at a pupil image plane where the pupil image is in sharp focus without analyzer lenses 16 and 18. The precise shape of this sharply focused entrance pupil image is observed, measured and/or recorded for subsequent use in deriving the wavefront. In practice most optical systems have round pupils, such as in telescopes, microscopes, the human eye, etc., but even telescopes may have other pupil shapes, such as the hexagonal shape of the Keck telescope in Hawaii, and the human eye pupil is not always perfectly round.

The operation of the wavefront sensor 10 comprises alternately positioning the analyzer lenses 16 and 18 on the optical axis O in the objective image plane OIP and observing and/or recording the images formed on the detector D. As described above, when the analyzer lenses 16 and 18 are both moved off the optical axis O, the image of the entrance pupil P from the light source L will be in sharp focus on the pupil image plane PIP. When the negative analyzer lens 16 is positioned on the optical axis O, as shown in FIG. 1, a defocused pupil image that existed at a plane PI1, which is spaced at a distance d1 beyond the object image plane OIP, is now formed as a defocused pupil image at the normal pupil image plane PIP and is detected by the detector D and that defocused (extra-focused) pupil image will be observed and/or recorded. Subsequently, the positive analyzer lens 18 is positioned on the optical axis O and the defocused pupil image that existed at a pupil image plane PI2 at a distance d2 in front of the object image plane OIP, is formed as a second defocused pupil image on the detector D for observation and/or recording. By way of explanation, the distances d1 and d2 are the focal lengths of the analyzer lenses 16 and 18, respectively, and may be of any desired focal length. The focal lengths of the analyzer lenses 16 and 18 preferably are equal but opposite in optical power and therefore the distances d1 and d2 will be equal whereby the defocused entrance pupil images are at equal distances from the object image plane OIP and appear as equally defocused images on the detector D for conveniently comparing the two defocused pupil images. Unless the wavefront is perfectly flat and of uniform intensity, the two defocused pupil images will have different shapes and intensities that represent the curvature of the wavefront. The two defocused pupil images (or the shapes and light intensities for some detectors D) are communicated to a computer 22 and processed by data reduction software in the computer to derive the wavefront curvature and provide data appropriate for the particular application of the wavefront sensor 10.

Specifically, as is well known in the art, the wavefront is derived or recovered by solving the Poisson equation with respect to intensities with Dirichlet's boundary conditions relative to shape. An iterative data reduction algorithm or other non-linear fitting technique may be employed to compensate for non-linearity in measurements in an open loop system. In some applications the defocused pupil images, or even the focused pupil image without the analyzer lenses 16 and 18, may be displayed and observed on a screen 24 either alternately or displayed in different locations on the screen for visual analysis, such as a doctor examining a human eye. In some applications the wavefront data will be supplied to a deformable mirror 26 that is usable in an adaptive optics system for correcting the curvature of wavefront. For example, in the celestial telescope application illustrated in FIG. 1, the deformable mirror 26 is placed on the optical axis O in front of the lens 12 for receiving the light rays R from the light source L (a star) and preferably will be conjugate to the wavefront sensor and/or the aberrations to be corrected. Based on the wavefront data produced by the two defocused pupil images and processing by the computer 22, the mirror 26 is deformed to correct the wavefront by compensating for the aberrations caused by the earth's atmosphere or any other source. This compensation is repeated until the two defocused pupil images represent a complete correction of the aberrations whereby the correct image of the light source L (star) may be observed and captured elsewhere in the telescope system. Since the wavefront sensor 10 uses defocused pupil images for developing the wavefront data, a direct analysis of the wavefront curvature is achieved rather than the wavefront gradient produced by, for example, the Shack-Hartmann wavefront sensor that senses numerous discrete slopes of the wavefront.

The detector D that is used in the wavefront sensor of the present invention may be of any convenient type that is particularly suitable for the particular wavefront sensor application. For example, the detector may be a conventional detector in a video camera C (as shown in FIG. 1), a custom format of charge couple devices (CCD), an array of PIN diodes, an array of lenslets focusing the light onto a like array of optical fibers, photon detectors, etc. that will provide images and/or data relative to the light intensity throughout the defocused pupil images.

Although it is preferred that the various embodiments of the wavefront sensor of the present invention use two defocused pupil images for comparison and deriving the wavefront curvature, if reasonable assumptions can be made for the illumination pattern in the optical beam of the particular application to which the wavefront sensor is being applied, a single defocused pupil image may be used to develop sufficient data to derive the wavefront whereby only a single analyzer lens 16 or 18 may be used. This would eliminate the need for capturing alternate images as previously described with respect to the embodiment of FIG. 1. Although the accuracy of the derived wavefront using a single analyzer lens to create a single defocused pupil image generally will be compromised, this technique may be useful under some circumstances, such as where simplicity and cost are factors.

Referring now to FIG. 2, a second embodiment of the present invention is illustrated in simplified form to omit the illustration of the light source L, the computer 22, the screen 24 and the deformable mirror 26 that are illustrated in FIG. 1, although these elements and equivalence or alternates thereof could be included in the wavefront sensor 30 of FIG. 2. Again, the wavefront sensor 30 includes a lens 12 for collecting the light rays from the light source through an entrance pupil P, a collimating lens 20 and a detector D at the pupil image plane PIP, as shown and described above with respect to the embodiment of FIG. 1. Wavefront sensor 30 is provided with a birefringent lens 32 which, for example, is comprised of an optical element 34 having two different indices of refraction, such as calcite, on two different perpendicular polarization axes, which element 34 is sandwiched between a pair of optical elements 36 having an index of refraction that matches one of the indexes of a refraction of element 34, such as BK7 optical glass. The birefringent lens 32 or a combination of lenses has the characteristic of a positive lens in one orthogonal direction of polarization and of a negative lens in the other orthogonal direction of polarization, whereby the light rays provided through the collimating lens 20 to the pupil image plane PIP on the detector D simultaneously provides two defocused entrance pupil images on the detector D, which defocused pupil images correspond to the two defocused pupil images provided by the analyzer lenses 16 and 18 in the embodiment of FIG. 1. Again, preferably one defocused pupil image without the birefringent lens 32 exists in front of the object image plane OIP and the other defocused pupil image exists behind the object image plane PIP. The two defocused pupil images may be separated on the imaging detector D by decentering the birefringent lens 32 and introducing a tilt, whereby the two defocused pupil images may be separately detected at separate locations on the detector D and processed by a computer 22. Alternatively, a variable polarization element 38 may be positioned between the birefringent lens 32 and the detector D on the optical axis O and used to switch between the two polarizations to alternately impose the two defocused pupil images at the same location on the detector D. As a further alternative or modification to the wavefront sensor 30 of FIG. 2, the collimating lens 20 may be omitted by using a birefringent lens 32 that has a positive optical power in one orthogonal direction of polarization and no optical power in the other orthogonal direction of polarization but, although the two defocused pupil images will be symmetrical, the images will not be perfectly balanced with regard to defraction which may reduce the accuracy of this alternate arrangement. In each variation of this second embodiment of the invention, as with all the embodiments and variations, the optical system is designed and arranged so that the entrance pupil image is in sharp focus at the pupil image plane PIP on the detector D without the defocusing lens means (here the birefringent lens 32). This second embodiment of the present invention shown in FIG. 2 has certain advantages over the first embodiment of FIG. 1, such as, simultaneously producing the two defocused pupil images, avoiding the mechanism and step of moving the analyzer lenses, and the like, and yet retains the basic feature of maintaining the same optical distance between the defocusing lenses and the pupil image plane PIP of the detector D.

Referring now to FIGS. 3A and 3B, a wavefront sensor 40 is illustrated as the third embodiment of the present invention that is the same or similar to the first and second embodiments described above in several respects in that wavefront sensor 40 includes a lens 12 for receiving the light rays from a light source L and producing images on a detector D at a pupil image plane PIP. In the wavefront sensor 40, two 30/60 degree "Littrow" prisms 42, 44 are mounted back to back in the Köster configuration with the converging beam of light rays R directed onto the face 42a of one Littrow prism 42 with the optical axis O perpendicular to that face 42a of Littrow prism 42. A beam splitter 45 is provided at the abutting surfaces of the two Littrow prisms 42, 44 which may be in the form of a thin glass plate beam splitter or a coating on one of the abutting surfaces of the prism to split the incoming light rays 50-50, that is, to cause one half of the light to pass through the beam splitter 45 into prism 44 and cause the other one half of the light to reflect from the beam splitter 45 back into the prism 42. The light passing through the beam splitter 45 reflects off of the interior of surface 44a to a negative analyzer lens 46, similar to analyzer lens 16 of the first embodiment, and the light reflected off the beam splitter 45 then reflects off of the inside of surface 42a and passes through a positive analyzer lens 48, similar to positive analyzer lens 18 of the first embodiment of FIG. 1. Thus, the wavefront sensor 40 has two optical axes O' and O" along which the light from the same source passes through the analyzer lenses 48 and 46, respectively, to a collimating lens 20 and then to the pupil image plane PIP of the detector D to form two defocused pupil images. The Littrow prisms 42, 44 and the beam splitter 45 create two parallel propagating beams of exactly the same light and same optical path length, and the collimating lens 104 superimposes the defocused entrance pupil images on the detector D. The collimating lens 20 preferably is located one focal length away from the analyzer lenses 46 and 48 and one focal length from the pupil image plane PIP. As with the first embodiment illustrated in FIG. 1 and described above, the analyzer lenses 46 and 48 preferably, although not necessarily, are of equal but opposite focal lengths whereby the two defocused pupil images are located at equal distances in front of and behind the object image plane OIP and therefore the two defocused pupil images on the detector D are equally but oppositely defocused, as with the preferred embodiment shown in FIG. 1. Again, the analyzer lenses 46, 48 are moved out of the optical axes O' and O" for producing a sharply focused pupil image at the pupil image plane PIP on the detector D for original set-up and when such a focused pupil image is desired in the particular application of the wavefront sensor 40. As with the first embodiment, analyzer lenses 46, 48 of different focal lengths may be used, such as longer but opposite focal lengths for increasing the measurement dynamic range of the wavefront sensor 40 or, conversely, lenses of shorter but opposite focal lengths which will increase the sensitivity of the system to small aberrations.

As shown in FIGS. 3A and 3B, the two defocused pupil images are superimposed as pupil image I on detector D and the two defocused pupil images forming the illustrated single pupil image I may be separately sensed by the detector D by using a polarizing beam splitter 45 between the two Littrow prisms 42, 44 and then placing a suitable polarizer 43, such as a liquid crystal or other switchable polarization device, in the light beam to electronically select the defocused pupil image from analyzer lens 46 or analyzer lens 48.

Referring now to FIGS. 4A and 4B, a wavefront sensor 40' is illustrated that is a modification of the third embodiment wavefront sensor 40 of FIGS. 3A, 3B for providing separate defocused pupil images on the detector D. In this alternative embodiment, the two Littrow prisms 42', 44' are slightly tilted with respect to each other with their apexes 42b, 44b touching and a small gap G formed at the abutting surfaces opposite the apexes 42b, 44b, whereby the light passing through the beam splitter 45' and the light reflected thereby exit along optical axes Oa and Ob that are not parallel in contrast to the parallel optical axes O' and O" in FIG. 3A. Again, the light passes through the analyzer lenses 46, 48 and the collimating lens 20 for forming defocused entrance pupil images on the detector D. However, by reason of the tilting of the Littrow prisms 42' and 44' with respect to each other and the slightly nonparallel optical axes Oa, Ob, the two defocused pupil images Ia and Ib are separately formed on the detector D. Thus, the detector D separately and simultaneously provides the image and data of the two defocused pupil images Ia, Ib to the computer 22 or other devices without requiring polarization, sequential imaging or the like, as required by wavefront sensor 40.

Referring now to FIGS. 5A and 5B, a wavefront sensor 40" is illustrated that is another modification of the third embodiment wavefront sensors 40 and 40' described above. In this alternative embodiment, the pair of Littrow prisms 42", 44" in the Köster configuration are rotated as a unit about axis A at their apexes from the aligned position shown in FIG. 3A by a small angle to produce an angle θ between the optical axis O and surface 42a that is not 90°. This has the same effect as the alternate illustrated in FIG. 4A of creating two separate optical paths Oa and Ob and two separate pupil images Ia and Ib on detector D.

As still other alternatives to the optical arrangement of wave sensor 40 without tilting the Littrow prisms 42, 44, as shown in FIG. 4A, or rotating the Littrow prisms 42, 44, as shown in FIG. 5A, for separating the two defocused images Ia, Ib, separate prisms may be added at the exit faces of the two Littrow prisms 42 and 44 to cause the optical axes O', O" to be nonparallel, or the analyzer lenses 46 and 48 may be translated to direct the light rays in a nonparallel relationship, and these alternate methods are acceptable since they do not introduce any significant new aberrations.

Referring now to FIGS. 6A, 6B, 7 and 8, a wavefront sensor 50 comprising a fourth embodiment of the present invention is illustrated wherein, like the previously described embodiments, a lens 12 collects the light from a light source L through an entrance pupil P and directs the light through the system to a pupil image plane PIP on a detector D. As with the third embodiment shown in FIGS. 3A, 3B, 4A and 4B and described above, two Littrow prisms 52, 54 are provided back to back, with the optical axis O from the lens 12 being perpendicular to the surface 52a of Littrow prism 52, and the light rays intersect a beam splitter 55 at the abutting surfaces of the two Littrow prisms 52, 54 to allow half the light to pass into the Littrow prism 54 and to reflect the other half of the light back into the Littrow prism 52. Again, the beam splitter 55 may be a thin glass beam splitter or a coating on the abutting surface of one of the two Littrow prisms 52, 54. As an alternative, the beam splitter 55 may be a polarizing beam splitter for separating the images on the detector D. The light in the two optical paths then reflect off the interior surfaces 52a and 54a of the two Littrow prisms in parallel relationship and exit the Littrow prisms into two 60 degree prisms 56 and 58, respectively, where the light is reflected toward a membrane mirror 60 positioned parallel to and on the parting plane between the Littrow prisms 52, 54 and the 60 degree prisms 56, 58 in a cavity 62 formed among the opposing surfaces of the two 60 degree prisms 56, 58 and two additional 60 degree prisms 64, 66 (see FIG. 8). The membrane mirror 60 has a mirrored surface on each side and therefore when the mirror 60 is in a flat condition, as diagrammatically shown in FIG. 6A, the light rays are reflected off of opposite sides of membrane mirror 60 onto the inner surfaces of the two 60 degree prisms 64, 66 and then along parallel optical paths O' and O" through a collimating lens 20 to the pupil image plane PIP of the detector D. The optical axes O', O" may intersect at the pupil image plane PIP to form a single superimposed entrance pupil image, as shown in FIGS. 3A and 3B, whereby a single detector D may be used with appropriate means for segregating the two pupil images, as described above, or the optical axes O', O" may intersect the pupil image plane at two different locations for providing separate, simultaneous images Ia and Ib, as shown and described with respect to the alternative embodiments of FIGS. 4A, 4B, 5A and 5B. For example the angle θ may be other than 90°, as in FIG. 5A, to create two separate defocused pupil images on detector D. If the two defocused pupil images originating from the two light paths through the two Littrow prisms 52, 54 are superimposed on the detector D, they may be sequentially separated by polarizing the incoming light with a polarizing element 68 and a electroactive half-wave plate 70 for electronically rotating the polarization of the light by 90 degrees whereby the polarized beam splitter 55 alternately directs the light down one optical path or the other through the Littrow prisms 52 and 54, thereby sequentially providing the two defocused pupil images on the detector D. When the membrane mirror 60 is flat, the two pupil images will be identical and in focus on the pupil image plane PIP, such as for obtaining a focused entrance pupil image of the light source.

Referring now more particularly to FIGS. 7 and 8, the membrane mirror 60 is mounted in the cavity 62 by any convenient means, such as triangular support blocks 72 fixed along each edge of the membrane mirror 60, and the blocks 72 may be adhered to the corners formed between the 60 degree prisms 56, 58 and 64, 66. Plates 74 are positioned at opposite ends of the cavity 62 to enclose the cavity and the plates 74 are adhered to the 60 degree prisms 56, 58, 64, 66 thereby enclosing the cavity 62. Tubes 76 and 78 are connected to holes in one of the plates 74 on opposite sides of the membrane mirror 60, and the tubes 76 and 78 are connected to an actuator 80 that is capable of supplying pneumatic or hydraulic pressure to opposite sides of the membrane mirror 60 to cause deflection of the membrane mirror 60, as shown in FIG. 8. A pressure gauge or control 82 may be provided in one or both of the tubes 76, 78 for monitoring and/or controlling the pressures on one or both sides of the membrane mirror 60 to in turn control the magnitude of the deflection. When the membrane mirror 60 is deflected, one side becomes concave and the other side becomes convex so that the two pupil images transmitted along the two optical paths O' and O" created by the beam splitter 55 and Littrow prisms 52, 54 are not focused on the pupil image plane PIP of the detector D with one pupil image plane being located in front of the object image plane OIP and the other pupil image being behind the object image plane OIP. As a result, two defocused pupil images are created on the pupil image plane PIP on the detector D similar to the two defocused pupil images created in each of the above-described embodiments, even though the light rays do not pass through refractory lenses such as the analyzer lenses 16 and 18 or the birefringent lens 32. By varying the magnitude of the deflection of the membrane mirror 60 through the use of the actuator 80, the magnitude of the defocusing of the two images may be varied, whereby the sensitivity and other characteristics of the wavefront sensor may be varied, similar to substituting analyzer lenses 16 and 18 of different focal lengths. As a simplified alternative, the mirror 60 may be of a fixed concave-convex shape to provide defocused pupil images of a fixed amount.

Referring now to FIGS. 9A, 9B, 10, 11, 12 and 13, a wavefront sensor 90 comprising a modified form of the fourth embodiment of the present invention illustrated in FIGS. 6A, 6B, 7 and 9 is shown. This modified wavefront sensor 90 is the same as wavefront sensor 50 and its variations except in the shape of the pupil and the type of membrane mirror. Wavefront sensor 90 is illustrated as having a hexagonal pupil P' (see FIG. 10), such as exists in the Keck telescope in Hawaii, that in turn creates a hexagonal pupil image I' at the pupil image plane PIP on the detector D. Further, wavefront sensor 90 is provided with a mirror 91 that is of the so-called bimorph type which can be deflected controlably by electrical voltage. Mirror 91 is comprised of two layers 92 and 94 of PZT, PMN or any other electro-restrictive material with coatings 96 of gold on both sides of each layer 92, 94 (see FIG. 13), and the two gold-coated layers 92, 94 are adhered together. Two separate electrical wires 98, 99 are connected to the outer (exposed) gold coatings 96 on opposite sides of mirror 91, such as by soldering, and the wires extend out of the cavity 62 through one of the plates 74 where they are joined. Another wire 100 is electrically connected at one edge of mirror 91 to the two gold coatings 96 between the two layers 92, 94 and then extends through a plate 74. The two wires 98, 99 and wire 100 are electrically connected to an activator 102 for applying a controlled voltage across the respective electro-restrictive layers 92, 94 which causes the mirror 91 to defect in a controlled manner. The mirror 91 reflects light from both sides, the same as membrane mirror 60, and both sides may be provided with a reflective coating rather than relying on the gold coating. The mirror 91 may be controlled to a stationary magnitude of deflection or may be oscillated by controlling the voltage applied by actuator 102 to create alternative defocused pupil images at the pupil image plane PIP on the detector D, which alternating images may be separated electronically for deriving the wavefront.

By each of the above described embodiments and modifications thereof, two separate defocused pupil images, preferably defocused to the same distance in front of and behind the normal object image plane OIP, are provided to the detector D whereby those two defocused pupil images may be observed or detailed data concerning the shape of and the light intensity throughout the two defocused pupil images may be provided to a computer for deriving a direct representation of the wavefront curvature being sensed by each embodiment of the wavefront sensor of this invention. In turn, those observed defocused pupil images or the derived wavefront data may be used for any application in which such images or information is desirable. Although four different specific embodiments with some alternatives and modifications thereof have been shown and described that use specific optical elements in a specific arrangement, it will be readily appreciated and understood by those skilled in the art that other embodiments, alternatives and modifications may be used for performing substantially the same functions in substantially the same way to achieve the same results which are within the scope of this invention.

What is claimed is:

1. A wavefront sensor for detecting the wavefront produced by light waves from a light source, comprising, optical means for receiving the light waves from the light source and forming two defocused pupil images at two separate locations along an optical axis,
   a detector means positioned at a location on the optical axis relative to said optical means for detecting the light waves forming the two defocused pupil images, said light waves forming the two defocused pupil images traveling substantially the same distance through said optical means to said detector means, and
   means for processing the two defocused pupil images to determine the curvature of the wavefront of the light waves received by said optical means.

2. The wavefront sensor of claim 1, wherein said optical means includes two separate lenses of different focal lengths for producing the two defocused pupil images on said detector means.

3. The wavefront sensor of claim 2, wherein said optical means includes means for alternately passing the light waves through said two separate lenses to said detector means.

4. The wavefront sensor of claim 3, wherein said two separate lenses are physically moved into and out of the path of the light waves for said alternately passing of the light waves through said two separate lenses.

5. The wavefront sensor of claim 2, wherein said optical means includes means for simultaneously and separately directing the light waves through said two separate lenses to said detector means.

6. The wavefront sensor of claim 5, wherein the two defocused pupil images are formed at separate locations on the detector means.

7. The wavefront sensor of claim 5, wherein the two defocused pupil images are superimposed on said detector means, and means are provided for distinguishing between said two defocused pupil images.

8. The wavefront sensor of claim 7, wherein said distinguishing means includes means for polarizing the light waves.

9. The wavefront sensor of claim 8, wherein said distinguishing means includes means for switching the polarization of the light waves between said two separate lenses.

10. The wavefront sensor of claim 5, wherein said processing means includes means for electrically separating the two defocused pupil images before determining the curvature of the wavefront.

11. The wavefront sensor of claim 1, wherein said optical means includes a birefringent lens for producing the two defocused pupil images.

12. The wavefront sensor of claim 11, wherein said birefringent lens is decentered for separating the two defocused pupil images on said detector means.

13. The wavefront sensor of claim 11, wherein said optical means includes a variable polarization element for switching between polarized images formed by said birefringent lens.

14. The wavefront sensor of claim 1, wherein said optical means includes a collimating lens in advance of the detector means.

15. The wavefront sensor of claim 1, wherein said optical means includes means for splitting the light waves into two optical paths of substantially the same length to the detector means for forming said two defocused pupil images.

16. The wavefront sensor of claim 15, wherein said means for splitting the light waves includes a beam splitter between two Littrow prisms.

17. The wavefront sensor of claim 16, wherein said two Littrow prisms are tilted with respect to each other for separating the two defocused images on the detector means.

18. The wavefront sensor of claim 16, wherein said two Littrow prisms are tilted with respect to light from the light source.

19. The wavefront sensor of claim 15, further including a reflective member interposed at a location where the two optical paths cross, said reflective member having two sides with both sides being reflective, and one said side being concave and the other said side being convex for each said side to form one of said defocused pupil images.

20. The wavefront sensor of claim 15, further including a reflective member positioned in the two optical paths with one said optical path intersecting one side of said member and the other said optical path intersecting the other side of said member, and means for causing said member to deform to form one of the defocused pupil images from one side of said member and the other defocused pupil image from the other side of said member.

21. The wavefront sensor of claim 20, further including means for causing said reflective member to oscillate between concave and convex deflections.

22. The wavefront sensor of claim 20, wherein said means for causing said reflective member to deform includes means for adjusting the magnitude of deformation such reflective member.

23. The wavefront sensor of claim 1, wherein said optical means causes equal and opposite magnitudes of defocusing of said two defocused pupil images with respect to said detector means.

24. A wavefront sensor for detecting the wavefront produced by light waves from a light source, comprising, optical means for receiving the light waves from the light source through a pupil and having means for forming two defocused pupil images at a pupil image plane on an optical axis of said optical means, said two defocused pupil images being equally and oppositely defocused, a detector means positioned at the pupil image plane for detecting the light waves as two equally and oppositely defocused pupil images, said light waves traveling substantially the same distance through said optical means from said pupil to said pupil image plane, and means for processing the two defocused pupil images to determine the curvature of the wavefront of the light waves received by said optical means.

25. The wavefront sensor of claim 24, wherein said optical means includes two separate lenses of different focal lengths for forming the two defocused pupil images at the pupil image plane from images at two locations along the optical axis that are equal distances in front of and behind an object image plane.

26. The wavefront sensor of claim 25, wherein said optical means includes means for alternately passing the light waves through said two separate lenses to said detector means.

27. The wavefront sensor of claim 26, wherein said two separate lenses are physically moved into and out of the path of the light waves for said alternately passing of the light waves through said two separate lenses.

28. The wavefront sensor of claim 25, wherein said optical means includes means for simultaneously and separately directing the light waves through said two separate lenses along two separate optical paths to said detector means.

29. The wavefront sensor of claim 28, wherein the two defocused pupil images are detected at separate locations on the detector means.

30. The wavefront sensor of claim 28, wherein the two defocused pupil images are superimposed on said detector means, and means are provided for distinguishing between said two defocused pupil images by said processing means.

31. The wavefront sensor of claim 30, wherein said distinguishing means includes means for polarizing the light waves.

32. The wavefront sensor of claim 31, wherein said distinguishing means includes means for electronically switching the polarization of the light waves between said two separate lenses.

33. The wavefront sensor of claim 28, wherein said processing means includes means for electrically separating the two defocused pupil images before determining the curvature of the wavefront.

34. The wavefront sensor of claim 24, wherein said optical means includes a birefringent lens for producing the two defocused pupil images.

35. The wavefront sensor of claim 34, wherein said birefringent lens is decentered for separating the two defocused pupil images on said detector means.

36. The wavefront sensor of claim 34, wherein said optical means includes a variable polarization element for switching between polarized images formed by said birefringent lens.

37. The wavefront sensor of claim 34, wherein said optical means includes a collimating lens in advance of the detector means.

38. The wavefront sensor of claim 24, wherein said optical means includes two Littrow prisms for separating the light waves into two optical paths before reaching said optical means for forming said two defocused pupil images.

39. The wavefront sensor of claim 38, wherein a beam splitter is provided between said two Littrow prisms.

40. The wavefront sensor of claim 38, wherein said two Littrow prisms are tilted with respect to each other for separating the two defocused pupil images on said detector means.

41. The wavefront sensor of claim 24, wherein said optical means includes means for splitting the light waves into two optical paths of the same length to the detector means for forming said two defocused pupil images on the pupil image plane.

42. A wavefront sensor for detecting the wavefront produced by light waves from a light source, comprising, optical means for receiving the light waves from the light source and producing at least one defocused pupil image, each defocused pupil image being at different distances along an optical axis of said optical means, a detector means positioned at a pupil image plane on the optical axis for detecting the light waves forming each defocused pupil image, said light waves traveling substantially the same distance through said optical means to said pupil image plane for forming each said defocused pupil image, and means for processing each defocused pupil image to determine the curvature of the wavefront of the light waves received by said optical means.

43. The wavefront sensor of claim 42, wherein said optical means includes two separate lenses of different focal lengths for producing two defocused pupil images.

44. A method of detecting a wavefront produced by light waves from a light source, comprising the steps of optically producing two defocused pupil images of the light waves at two different locations,
    detecting the light waves forming the two defocused pupil images at a location spaced from said two locations of the two defocused pupil images for detecting the two defocused pupil images, and
    processing the two defocused pupil images to determine the curvature of the wavefront of the light waves,
    wherein an optical path of the formation of each of the two defocused pupil images is of substantially the same length to the detecting location.

45. A method of detecting a wavefront produced by light waves from a light source, comprising the steps of optically producing a sharply focused entrance pupil image on a pupil image plane in an optical system and producing at least one defocused pupil image of the light waves at a distance from the pupil image plane,
    detecting light waves forming each said defocused pupil image at a location on the pupil image plane for detecting at least one defocused pupil image, and
    processing the defocused pupil image to determine the curvature of the wavefront of the light waves,
    wherein an optical path of the formation of each of the defocused pupil images is of substantially the same length to the detecting location.

46. The method of claim 45, wherein two defocused pupil images are detected, said two defocused pupil images being oppositely and equally defocused.

47. A wavefront sensor for detecting the wavefront produced by light waves from a light source, comprising, optical means for receiving the light waves from the light source and forming two defocused pupil images at two separate locations along an optical axis,
    a detector means positioned at a location on the optical axis relative to said optical means for detecting the light waves forming the two defocused pupil images, and
    means for processing the two defocused pupil images to determine the curvature of the wavefront of the light waves received by said optical means,
    wherein said optical means includes two separate lenses of different focal lengths for producing the two defocused pupil images on said detector means.

48. The wavefront sensor of claim 47, wherein said optical means includes means for alternately passing the light waves through said two separate lenses to said detector means.

49. The wavefront sensor of claim 47, wherein said optical means includes means for simultaneously and separately directing the light waves through said two separate lenses to said detector means.

50. The wavefront sensor of claim 49, wherein the two defocused pupil images are formed at separate locations on the detector means.

51. The wavefront sensor of claim 49, wherein the two defocused pupil images are superimposed on said detector means, and light polarizing means are provided for distinguishing between said two defocused pupil images.

52. The wavefront sensor of claim 47, wherein said optical means includes a collimating lens between said detector means and said two separate lenses.

53. A wavefront sensor for detecting the wavefront produced by light waves from a light source, comprising, optical means for receiving the light waves from the light source and forming two defocused pupil images at two separate locations along an optical axis,
    a detector means positioned at a location on the optical axis relative to said optical means for detecting the light waves forming the two defocused pupil images, and
    means for processing the two defocused pupil images to determine the curvature of the wavefront of the light waves received by said optical means,
    wherein said optical means includes a birefringent lens for producing the two defocused pupil images.

54. The wavefront sensor of claim 53, wherein said birefringent lens is decentered for separating the two defocused pupil images on said detector means.

55. The wavefront sensor of claim 53, wherein said optical means includes a variable polarization element for switching between polarized images formed by said birefringent lens.

56. The wavefront sensor of claim 53, wherein said optical means includes a collimating lens between said detector means and said birefringent lens.

57. A wavefront sensor for detecting the wavefront produced by light waves from a light source, comprising, optical means for receiving the light waves from the light source and forming two defocused pupil images at two separate locations along an optical axis,
    a detector means positioned at a location on the optical axis relative to said optical means for detecting the light waves forming the two defocused pupil images, and
    means for processing the two defocused pupil images to determine the curvature of the wavefront of the light waves received by said optical means,
    wherein said optical means includes means for splitting the light waves into two optical paths of the same length to the detector means for forming said two defocused pupil images.

58. The wavefront sensor of claim 57, wherein said means for splitting the light waves includes a beam splitter between two Littrow prisms.

59. The wavefront sensor of claim 58, wherein said two Littrow prisms are tilted with respect to each other for separating the two defocused images on the detector means.

60. The wavefront sensor of claim 58, wherein said two Littrow prisms are tilted with respect to light from the light source.

61. The wavefront sensor of claim 57, further including a reflective member interposed at a location where the two optical paths cross, said reflective member having two sides with both sides being reflective, and one said side being concave and the other said side being convex for each said side to form one of said defocused pupil images.

62. The wavefront sensor of claim 57, further including a reflective member positioned in the two optical paths with one said optical path intersecting one side of said member and the other said optical path intersecting the other side of said member, and means for causing said member to deform to form one of the defocused pupil images from one side of said member and the other defocused pupil image from the other side of said member.

63. The wavefront sensor of claim 62, further including means for causing said reflective member to oscillate between concave and convex deflections.

64. The wavefront sensor of claim 62, wherein said means for causing said reflective member to deform includes means for adjusting the magnitude of deformation of said reflective member.

65. The wavefront sensor of claim 57, wherein said optical means causes equal and opposite magnitudes of defocusing of said two defocused pupil images with respect to said detector means.

66. A wavefront sensor for detecting the wavefront produced by light waves from a light source, comprising, optical means for receiving the light waves from the light source through a pupil and having two separate lenses of different focal lengths for forming two defocused pupil images at a pupil image plane from images at two locations that are equal distances in front of and behind an object image plane on an optical axis of said optical means, said two defocused pupil images being equally and oppositely defocused, a detector means positioned at the pupil image plane for detecting the light waves as two equally and oppositely defocused pupil images, and means for processing the two defocused pupil images to determine the curvature of the wavefront of the light waves received by said optical means.

67. The wavefront sensor of claim 66, wherein said optical means includes means for alternately passing the light waves through said two separate lenses to said detector means.

68. The wavefront sensor of claim 66, wherein said optical means includes means for simultaneously and separately directing the light waves through said two separate lenses along two separate optical paths to said detector means.

69. The wavefront sensor of claim 68, wherein the two defocused pupil images are detected at separate locations on the detector means.

70. The wavefront sensor of claim 66, wherein the two defocused pupil images are superimposed on said detector means, and light polarizing means are provided for distinguishing between said two defocused pupil images by said processing means.

71. The wavefront sensor of claim 66, wherein said optical means includes a collimating lens between said detector means and said two separate lenses.

72. The wavefront sensor of claim 66, wherein said optical means includes two Littrow prisms for separating the light waves into two optical paths before reaching said two separate lenses.

73. The wavefront sensor of claim 72, wherein a beam splitter is provided between said two Littrow prisms.

74. The wavefront sensor of claim 72, wherein said two Littrow prisms are tilted with respect to each other for separating the two defocused pupil images on said detector means.

75. The wavefront sensor of claim 66, wherein said optical means includes means for splitting the light waves into two optical paths of the same length to said detector means for forming said two defocused pupil images on the pupil image plane.

76. A wavefront sensor for detecting the wavefront produced by light waves from a light source, comprising, optical means for receiving the light waves from the light source through a pupil and having a birefringent lens for producing two defocused pupil images at a pupil image plane on an optical axis of said optical means, said two defocused pupil images being equally and oppositely defocused, a detector means positioned at the pupil image plane for detecting the light waves as two equally and oppositely defocused pupil images, and means for processing the two defocused pupil images to determine the curvature of the wavefront of the light waves received by said optical means.

77. The wavefront sensor of claim 76, wherein said birefringent lens is decentered for separating the two defocused pupil images on said detector means.

78. The wavefront sensor of claim 76, wherein said optical means includes a variable polarization element for switching between polarized images formed by said birefringent lens.

79. The wavefront sensor of claim 76, wherein said optical means includes a collimating lens between said birefringent lens and said detector means.

80. A wavefront sensor for detecting the wavefront produced by light waves from a light source, comprising, optical means for receiving the light waves from the light source through a pupil and having means for splitting the light waves into two optical paths of the same length to said detector means and forming two defocused pupil images at a pupil image plane on an optical axis of said optical means, said two defocused pupil images being equally and oppositely defocused, a detector means positioned at the pupil image plane for detecting the light waves as two equally and oppositely defocused pupil images, and means for processing the two defocused pupil images to determine the curvature of the wavefront of the light waves received by said optical means.

81. The wavefront sensor of claim 80, wherein said means for splitting the light waves into two optical paths includes two Littrow prisms.

82. The wavefront sensor of claim 81, wherein a beam splitter is provided between said two Littrow prisms.

83. The wavefront sensor of claim 81, wherein said two Littrow prisms are tilted with respect to each other for separating the two defocused pupil images on said detector means.

84. A wavefront sensor for detecting the wavefront produced by light waves from a light source, comprising, optical means for receiving the light waves from the light source and having two separate lenses of different focal lengths for producing at least one defocused pupil image, each defocused pupil image being at different distances along an optical axis of said optical means, a detector means positioned at a pupil image plane on the optical axis for detecting the light waves forming each defocused pupil image, and means for processing each defocused pupil image to determine the curvature of the wavefront of the light waves received by said optical means.

85. A method of detecting a wavefront produced by light waves from a light source, comprising the steps of, optically refracting the light waves for producing two defocused pupil images of the light waves at two different locations along an optical axis, detecting the light waves forming the two defocused pupil images at a location spaced along the optical axis from said two locations of the two defocused pupil images for detecting the two defocused pupil images, and processing the two defocused pupil images to determine the curvature of the wavefront of the light waves.

86. The method of detecting a wavefront of claim 85, wherein an optical path of the formation of each of the two defocused pupil images is of the same length to the detecting location.

87. The method of detecting a wavefront of claim 85, including a step of simultaneously and separately directing the light waves through two separate optical paths before refracting the light waves for producing the two defocused pupil images.

88. A method of detecting a wavefront produced by light waves from a light source, comprising the steps of, optically producing a sharply focused entrance pupil image on a pupil image plane in an optical system, optically refracting the light waves for producing at least one defocused pupil image of the light waves at a distance from the pupil image plane, detecting light waves forming each said defocused pupil image at a location on the pupil image plane for detecting said at least one defocused pupil image, and processing said at least one defocused pupil image to determine the curvature of the wavefront of the light waves.

89. The method of claim 88, wherein two defocused pupil images are detected, said two defocused pupil images being oppositely and equally defocused.

90. The method of detecting a wavefront of claim 89, wherein an optical path of the formation of each of the two defocused pupil images is of the same length to the detecting location.

91. The method of detecting a wavefront of claim 90, including a step of simultaneously and separately directing the light waves through two separate optical paths before refracting the light waves for producing the two defocused pupil images.

92. A wavefront sensor for detecting the wavefront produced by light waves from a light source, comprising;

optical means for receiving the light waves from the light source through a pupil and forming a focused pupil image at a pupil image plane on an optical axis, a detector positioned on the optical axis at said pupil image plane, said optical means including means for forming two defocused pupil images at two separate locations along the optical axis between the pupil and said detector, said detector including means for detecting the light waves forming the two defocused pupil images, and means for receiving and processing the two defocused pupil images from said detector to determine the curvature of the wavefront of the light waves received by said optical means.

93. The wavefront sensor of claim 92, wherein said means for forming the two defocused pupil images includes two separate lenses of different focal lengths for producing the two defocused pupil images on said detector means.

94. The wavefront sensor of claim 93, wherein said optical means includes means for alternately passing the light waves through said two separate lenses to said detector means.

95. The wavefront sensor of claim 92, wherein said optical means includes a birefringent lens for producing the two defocused pupil images.

96. The wavefront sensor of claim 95, wherein said birefringent lens is decentered for separating the two defocused pupil images on said detector means.

97. The wavefront sensor of claim 95, wherein said optical means includes a variable polarization element for switching between polarized images formed by said birefringent lens.

98. The wavefront sensor of claim 92, wherein said optical means includes means for splitting the light waves into two optical paths of the same length to the detection means for forming said two defocused pupil images.

99. The wavefront sensor of claim 98, wherein said means for splitting the light waves includes a beam splitter between two Littrow prisms.

100. The wavefront sensor of claim 98, further including a reflective member interposed at a location where the two optical paths cross, said reflective member having two sides with both sides being reflective, and one said side being concave and the other said side being convex for each said side to form one of said defocused pupil images.

101. The wavefront sensor of claim 98, further including a reflective member positioned in the two optical paths with one said optical path intersecting one side of said member and the other said optical path intersecting the other side of said member, and means for causing said member to deform to form one of the defocused pupil images from one side of member and the other defocused pupil image from the other side of said member.

102. The wavefront sensor of claim 101, further including means for causing said reflective member to oscillate between concave and convex deflections.

103. The wavefront sensor of claim 101, wherein said means for causing said reflective member to deform includes means for adjusting the magnitude of deformation of said reflective member.

104. The wavefront sensor of claim 92, wherein said means for forming two defocused pupil images cause equal and opposite magnitudes of defocusing of said two defocused pupil images with respect to said detector means.

* * * * *